(12) United States Patent
Herrera et al.

(10) Patent No.: US 12,385,494 B2
(45) Date of Patent: Aug. 12, 2025

(54) FAN FOR HANDHELD BLOWER

(71) Applicant: MILWAUKEE ELECTRIC TOOL CORPORATION, Brookfield, WI (US)

(72) Inventors: Nathaniel A. Herrera, Oak Creek, WI (US); Beth E. Cholst, Wauwatosa, WI (US); Shannon C. Bartlett, Cedarburg, WI (US); John L. Whealon, West Bend, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/572,095

(22) PCT Filed: Oct. 10, 2022

(86) PCT No.: PCT/US2022/046176
§ 371 (c)(1),
(2) Date: Dec. 19, 2023

(87) PCT Pub. No.: WO2023/064213
PCT Pub. Date: Apr. 20, 2023

(65) Prior Publication Data
US 2024/0280110 A1 Aug. 22, 2024

Related U.S. Application Data

(60) Provisional application No. 63/254,296, filed on Oct. 11, 2021.

(51) Int. Cl.
*F04D 25/08* (2006.01)
*A01G 20/43* (2018.01)
(Continued)

(52) U.S. Cl.
CPC .............. *F04D 25/08* (2013.01); *F04D 29/32* (2013.01); *F04D 29/34* (2013.01); *F04D 29/38* (2013.01)

(58) Field of Classification Search
CPC ........... A01G 20/47; A01G 20/43; A47L 5/14; A47L 5/24; A47L 5/22; A47L 5/28;
(Continued)

(56) References Cited

U.S. PATENT DOCUMENTS

| 1,898,410 A | 2/1933 | Wales |
| 2,284,586 A | 5/1942 | McDermott |

(Continued)

FOREIGN PATENT DOCUMENTS

| CA | 2825035 A1 | 8/2012 |
| CN | 2053083 U | 2/1990 |

(Continued)

OTHER PUBLICATIONS

Machine Translation of CN 2628767 [retrieved on Sep. 4, 2024]. Retrieved from: Espacenet. (Year: 2024).*
(Continued)

*Primary Examiner* — Eric J Zamora Alvarez
(74) *Attorney, Agent, or Firm* — Dority & Manning, P.A.

(57) ABSTRACT

A fan includes a hub and a plurality of blades extending radially outwardly from the hub and spaced circumferentially about the hub. The plurality of blades includes a reference blade, a first blade, and a second blade. The reference blade is disposed after the first blade in a circumferential direction about the hub. The second blade is disposed after the reference blade in the circumferential direction. The first blade is circumferentially spaced a first distance from the reference blade. The second blade is circumferentially spaced a second distance from the reference blade. The first distance is greater than the second distance.

19 Claims, 9 Drawing Sheets

(51) Int. Cl.
*F04D 25/06* (2006.01)
*F04D 29/32* (2006.01)
*F04D 29/34* (2006.01)
*F04D 29/38* (2006.01)
*F04D 29/66* (2006.01)

(58) Field of Classification Search
CPC ......... A47L 9/02; F04D 19/002; F04D 25/08; F04D 29/545; F04D 29/32; F04D 29/34; F04D 25/084; F04D 29/281; F04D 29/327; F04D 29/329; F04D 29/38; F04D 29/388; F04D 25/0673; F04D 29/666; F05B 2240/301
See application file for complete search history.

(56) References Cited

U.S. PATENT DOCUMENTS

| | | | |
|---|---|---|---|
| 2,768,782 | A | 10/1956 | Tateishi |
| 2,938,527 | A | 5/1960 | Nichols |
| 3,346,174 | A | 10/1967 | Lievens et al. |
| 3,407,431 | A | 10/1968 | Melnik |
| 3,540,547 | A | 11/1970 | Coward, Jr. |
| 4,185,688 | A | 1/1980 | Wiater et al. |
| 4,222,318 | A | 9/1980 | Patton et al. |
| 4,413,371 | A | 11/1983 | Tuggle et al. |
| 4,597,203 | A | 7/1986 | Middleton |
| 4,615,069 | A | 10/1986 | Henning |
| 4,692,091 | A | 9/1987 | Ritenour |
| 4,696,450 | A | 9/1987 | Huang |
| 4,734,017 | A | 3/1988 | Levin |
| 4,773,119 | A | 9/1988 | Duthie et al. |
| 4,792,286 | A | 12/1988 | Gassen |
| 4,794,225 | A | 12/1988 | Maese |
| 4,821,366 | A | 4/1989 | Levine |
| 4,838,151 | A | 6/1989 | Shin-Chin |
| 4,884,314 | A | 12/1989 | Miner et al. |
| 4,945,604 | A | 8/1990 | Miner et al. |
| 4,981,414 | A | 1/1991 | Sheets |
| 5,035,586 | A | 7/1991 | Sadler et al. |
| 5,195,208 | A | 3/1993 | Yamami et al. |
| 5,267,371 | A | 12/1993 | Soler et al. |
| 5,269,665 | A | 12/1993 | Sadler et al. |
| 5,383,427 | A | 1/1995 | Tuggle et al. |
| 5,511,281 | A | 4/1996 | Webster |
| 5,560,076 | A | 10/1996 | Leung |
| 5,701,631 | A | 12/1997 | Lindquist |
| 5,768,749 | A | 6/1998 | Ohi et al. |
| 5,821,473 | A | 10/1998 | Takahashi |
| 5,839,397 | A | 11/1998 | Funabashi et al. |
| 5,938,527 | A | 8/1999 | Oshima et al. |
| 5,975,862 | A | 11/1999 | Arahata et al. |
| 5,979,013 | A | 11/1999 | Beckey et al. |
| 6,006,400 | A | 12/1999 | Presenza |
| 6,105,206 | A | 8/2000 | Tokumaru et al. |
| 6,158,082 | A | 12/2000 | Beckey et al. |
| 6,244,823 | B1 | 6/2001 | Marino et al. |
| 6,305,048 | B1 | 10/2001 | Salisian |
| 6,324,720 | B1 | 12/2001 | Beckey et al. |
| 6,324,721 | B2 | 12/2001 | Doragrip |
| 6,370,729 | B2 | 4/2002 | Miyamoto |
| 6,442,790 | B1 | 9/2002 | Svoboda et al. |
| 6,464,459 | B2 | 10/2002 | Illingworth |
| 6,468,053 | B2 | 10/2002 | Wölpert |
| 6,497,553 | B2 | 12/2002 | Illingworth et al. |
| 6,514,036 | B2 | 2/2003 | Marshall et al. |
| 6,520,449 | B2 | 2/2003 | Illingworth |
| 6,543,726 | B2 | 4/2003 | Illingworth |
| 6,565,321 | B1 | 5/2003 | Illingworth et al. |
| 6,575,695 | B1 | 6/2003 | Miyamoto |
| 6,595,753 | B1 | 7/2003 | Illingworth et al. |
| 6,616,094 | B2 | 9/2003 | Illingworth |
| 6,619,922 | B2 | 9/2003 | Illingworth et al. |
| 6,623,352 | B2 | 9/2003 | Illingworth |
| 6,687,951 | B2 | 2/2004 | Illingworth et al. |
| 6,689,225 | B2 | 2/2004 | Illingworth |
| 6,719,830 | B2 | 4/2004 | Illingworth et al. |
| 6,729,839 | B1 | 5/2004 | Illingworth et al. |
| 6,796,858 | B2 * | 9/2004 | Dusablon ............... B63H 11/08 440/38 |
| 6,802,693 | B2 | 10/2004 | Reinfeld et al. |
| 6,802,881 | B2 | 10/2004 | Illingworth et al. |
| 6,811,687 | B2 | 11/2004 | Illingworth |
| 6,857,163 | B2 | 2/2005 | Iida et al. |
| 6,881,025 | B2 | 4/2005 | Illingworth et al. |
| 6,957,472 | B2 | 10/2005 | Illingworth et al. |
| 6,960,063 | B2 | 11/2005 | Reinfeld et al. |
| 7,055,213 | B2 | 6/2006 | Iida et al. |
| 7,143,468 | B2 | 12/2006 | Illingworth et al. |
| 7,300,484 | B2 | 11/2007 | Scully et al. |
| 7,600,290 | B1 | 10/2009 | Peters |
| 7,607,244 | B2 | 10/2009 | Hishida |
| 7,735,188 | B2 | 6/2010 | Shaffer |
| 7,774,896 | B2 | 8/2010 | Andresen et al. |
| 7,845,048 | B1 | 12/2010 | Bailey et al. |
| 7,850,513 | B1 | 12/2010 | Parker et al. |
| 7,922,470 | B2 | 4/2011 | Joseph |
| 7,941,894 | B1 | 5/2011 | Skorput |
| 8,266,762 | B2 | 9/2012 | Hsu |
| 8,449,589 | B1 | 5/2013 | Harsy |
| 8,510,910 | B1 | 8/2013 | Ramsey |
| 8,745,815 | B2 | 6/2014 | Takano et al. |
| 8,894,382 | B2 | 11/2014 | Binder |
| 8,918,956 | B2 | 12/2014 | Pellenc |
| 8,967,949 | B2 | 3/2015 | Gamissans Bou |
| 9,004,854 | B2 | 4/2015 | Nakazawa |
| 9,057,166 | B2 | 6/2015 | Prager |
| 9,062,681 | B2 * | 6/2015 | Lee ........................ F04D 19/007 |
| 9,167,751 | B2 | 10/2015 | Thackery et al. |
| 9,277,844 | B1 | 3/2016 | Millan |
| 9,364,125 | B2 | 6/2016 | Takahashi |
| 9,439,548 | B2 | 9/2016 | Jenson |
| 9,456,722 | B2 | 10/2016 | Tomasiak et al. |
| 9,538,711 | B2 | 1/2017 | Mutoh et al. |
| 9,603,497 | B2 | 3/2017 | Yamaoka et al. |
| 9,737,182 | B2 | 8/2017 | Gindele et al. |
| 9,861,242 | B2 | 1/2018 | Tomasiak et al. |
| 9,869,327 | B2 | 1/2018 | Kodato et al. |
| D812,825 | S | 3/2018 | Smith et al. |
| 9,970,445 | B2 | 5/2018 | Kodato et al. |
| 9,974,241 | B2 | 5/2018 | Yamaoka et al. |
| 10,000,900 | B2 | 6/2018 | Yamaoka et al. |
| 10,065,219 | B2 | 9/2018 | Suzuki et al. |
| 10,091,954 | B1 | 10/2018 | Yamaoka et al. |
| 10,227,988 | B2 | 3/2019 | Gao et al. |
| 10,232,502 | B2 | 3/2019 | Bylund et al. |
| 10,264,739 | B2 | 4/2019 | Yamaoka et al. |
| 10,267,323 | B2 | 4/2019 | Patrick |
| 10,306,843 | B2 | 6/2019 | Thackery et al. |
| 10,337,526 | B2 | 7/2019 | Shao et al. |
| 10,375,901 | B2 | 8/2019 | Bermudez et al. |
| 10,398,095 | B2 | 9/2019 | Gao et al. |
| 10,405,707 | B2 * | 9/2019 | Zhu ........................ F04D 29/545 |
| 10,487,850 | B2 | 11/2019 | Shao et al. |
| 10,670,048 | B2 | 6/2020 | Landén et al. |
| 10,674,681 | B2 | 6/2020 | Bermudez et al. |
| 10,722,085 | B2 | 7/2020 | Gao et al. |
| 10,774,487 | B2 | 9/2020 | Yamaoka et al. |
| 10,897,858 | B2 | 1/2021 | Hoffman et al. |
| 10,947,983 | B2 | 3/2021 | Hoffman |
| 2001/0054212 | A1 | 12/2001 | Walker |
| 2002/0060107 | A1 | 5/2002 | Kamoshita et al. |
| 2002/0148069 | A1 | 10/2002 | Illingworth |
| 2002/0155002 | A1 | 10/2002 | Reinfeld et al. |
| 2002/0176777 | A1 | 11/2002 | Reinfeld et al. |
| 2002/0176778 | A1 | 11/2002 | Reinfeld et al. |
| 2002/0182077 | A1 | 12/2002 | Reinfeld et al. |
| 2002/0182078 | A1 | 12/2002 | Reinfeld et al. |
| 2003/0033689 | A1 | 2/2003 | Marshall et al. |
| 2003/0136094 | A1 | 7/2003 | Illingworth et al. |
| 2003/0150198 | A1 | 8/2003 | Illingworth et al. |
| 2003/0167741 | A1 | 9/2003 | Illingworth et al. |
| 2003/0221399 | A1 | 12/2003 | Hall |
| 2004/0018089 | A1 | 1/2004 | Illingworth et al. |

(56) References Cited

U.S. PATENT DOCUMENTS

| | | |
|---|---|---|
| 2004/0091357 A1 | 5/2004 | Reinfeld et al. |
| 2004/0139709 A1 | 7/2004 | Illingworth et al. |
| 2004/0139710 A1 | 7/2004 | Illingworth et al. |
| 2004/0159109 A1 | 8/2004 | Harvie |
| 2006/0182502 A1 | 8/2006 | Schliemann et al. |
| 2007/0209346 A1 | 9/2007 | Bovo et al. |
| 2007/0217914 A1* | 9/2007 | Fujimura ............... F01D 5/3015 416/219 R |
| 2007/0280829 A1* | 12/2007 | Stevens .................. F04D 29/164 416/189 |
| 2007/0294855 A1 | 12/2007 | Iida et al. |
| 2008/0089785 A1 | 4/2008 | Schliemann et al. |
| 2008/0098703 A1 | 5/2008 | Lucas et al. |
| 2008/0141541 A1 | 6/2008 | Hurley |
| 2009/0038108 A1 | 2/2009 | Shaanan et al. |
| 2009/0078485 A1 | 3/2009 | Gutsch et al. |
| 2009/0241285 A1 | 10/2009 | Hinklin et al. |
| 2009/0282642 A1 | 11/2009 | Batchelder et al. |
| 2010/0003149 A1 | 1/2010 | Nelson |
| 2010/0192314 A1 | 8/2010 | Otsuka et al. |
| 2010/0247316 A1 | 9/2010 | Aynsley et al. |
| 2011/0146023 A1 | 6/2011 | Wada et al. |
| 2012/0093490 A1 | 4/2012 | Steinberg |
| 2012/0096672 A1 | 4/2012 | Hatano et al. |
| 2012/0099996 A1* | 4/2012 | Delvaux ............... F04D 29/544 416/204 A |
| 2012/0138058 A1 | 6/2012 | Fu et al. |
| 2013/0017079 A1 | 1/2013 | Armstrong et al. |
| 2013/0180495 A1 | 7/2013 | Veerathappa et al. |
| 2013/0183141 A1 | 7/2013 | Tan |
| 2013/0206172 A1 | 8/2013 | Bjar et al. |
| 2014/0021203 A1 | 1/2014 | Walker et al. |
| 2014/0056738 A1 | 2/2014 | Takahashi |
| 2014/0086728 A1 | 3/2014 | Engert et al. |
| 2014/0105749 A1 | 4/2014 | Pellenc et al. |
| 2014/0140861 A1 | 5/2014 | Pellenc |
| 2014/0230181 A1* | 8/2014 | Yamaoka ............... A01G 20/47 15/344 |
| 2014/0356159 A1* | 12/2014 | Heikurinen ............... F01D 5/34 29/888.025 |
| 2015/0152879 A1* | 6/2015 | Tzeng .................. F04D 19/002 416/223 R |
| 2015/0282356 A1 | 10/2015 | Takahashi et al. |
| 2015/0377253 A1 | 12/2015 | Shibata et al. |
| 2016/0108924 A1 | 4/2016 | Conrad et al. |
| 2016/0120131 A1 | 5/2016 | Conrad et al. |
| 2016/0169249 A1 | 6/2016 | Takahashi et al. |
| 2016/0198636 A1 | 7/2016 | Poole et al. |
| 2016/0216249 A1 | 7/2016 | Sass |
| 2016/0265540 A1 | 9/2016 | Tirone et al. |
| 2016/0298635 A1 | 10/2016 | Su et al. |
| 2016/0305438 A1 | 10/2016 | Yamamoto et al. |
| 2016/0324380 A1 | 11/2016 | Sergyeyenko et al. |
| 2017/0042096 A1 | 2/2017 | Bylund et al. |
| 2017/0045058 A1 | 2/2017 | Bylund et al. |
| 2017/0045246 A1 | 2/2017 | Kaleta et al. |
| 2017/0208748 A1 | 7/2017 | Yamaoka et al. |
| 2017/0241423 A1 | 8/2017 | Han et al. |
| 2017/0273251 A1 | 9/2017 | Haramoto et al. |
| 2017/0273252 A1 | 9/2017 | Haramoto et al. |
| 2018/0000014 A1 | 1/2018 | Yamaoka et al. |
| 2018/0087513 A1 | 3/2018 | Hoffman |
| 2018/0094393 A1 | 4/2018 | Takahashi et al. |
| 2018/0146628 A1 | 5/2018 | Huo et al. |
| 2018/0146682 A1 | 5/2018 | Beau et al. |
| 2018/0209429 A1 | 7/2018 | Ishida |
| 2018/0320705 A1* | 11/2018 | Van Houten ............... F01P 5/02 |
| 2019/0021243 A1 | 1/2019 | Naka et al. |
| 2019/0098844 A1 | 4/2019 | Yang et al. |
| 2019/0162192 A1 | 5/2019 | Gao et al. |
| 2019/0191638 A1 | 6/2019 | Yamaoka et al. |
| 2019/0211830 A1 | 7/2019 | Liu et al. |
| 2019/0320598 A1 | 10/2019 | Bermudez et al. |
| 2020/0096001 A1 | 3/2020 | Chung |
| 2020/0096006 A1 | 3/2020 | Shao et al. |
| 2021/0227758 A1 | 7/2021 | Bylund et al. |
| 2022/0136526 A1 | 5/2022 | Shao et al. |

FOREIGN PATENT DOCUMENTS

| | | |
|---|---|---|
| CN | 2580819 Y | 10/2003 |
| CN | 2628767 Y | 7/2004 |
| CN | 101135139 A | 3/2008 |
| CN | 101260833 A | 9/2008 |
| CN | 201968600 U | 9/2011 |
| CN | 202015678 U | 10/2011 |
| CN | 102296555 A | 12/2011 |
| CN | 202157288 U | 3/2012 |
| CN | 203270492 U | 11/2013 |
| CN | 103671175 A | 3/2014 |
| CN | 203498784 U | 3/2014 |
| CN | 104074155 A | 10/2014 |
| CN | 204126922 U | 1/2015 |
| CN | 104564839 A | 4/2015 |
| CN | 204722966 U | 10/2015 |
| CN | 204811640 U | 12/2015 |
| CN | 105248156 A | 1/2016 |
| CN | 205276194 U | 6/2016 |
| CN | 106284148 A | 1/2017 |
| CN | 106284149 A | 1/2017 |
| CN | 106284153 A | 1/2017 |
| CN | 205999837 U | 3/2017 |
| CN | 206090426 U | 4/2017 |
| CN | 206289575 U | 6/2017 |
| CN | 107201734 A | 9/2017 |
| CN | 206480689 U | 9/2017 |
| CN | 107269550 A | 10/2017 |
| CN | 206815252 U | 12/2017 |
| CN | 107532604 A | 1/2018 |
| CN | 207498881 U | 6/2018 |
| CN | 207582389 U | 7/2018 |
| CN | 108476871 A | 9/2018 |
| CN | 212508973 U | 2/2021 |
| DE | 3812105 A1 | 9/1988 |
| DE | 8815616 U1 | 2/1989 |
| DE | 19523339 A1 | 1/1996 |
| DE | 29921751 U1 | 2/2000 |
| DE | 102007037011 A1 | 2/2008 |
| DE | 102010054841 A1 | 6/2012 |
| DE | 202017106572 U1 | 1/2018 |
| EP | 0821872 A2 | 2/1998 |
| EP | 2617281 A1 | 7/2013 |
| FR | 2224713 A1 | 10/1974 |
| FR | 2840172 A1 | 12/2003 |
| GB | 958481 A | 5/1964 |
| GB | 2156962 A | 10/1985 |
| GB | 2390118 A | 12/2003 |
| GB | 2513230 A | 10/2014 |
| JP | H0214790 A | 1/1990 |
| JP | 2749885 B2 | 5/1998 |
| JP | 2000018720 A | 1/2000 |
| JP | 2009264300 A | 11/2009 |
| JP | 2014037818 A | 2/2014 |
| KR | 101048421 B1 | 7/2011 |
| KR | 20110009355 U | 10/2011 |
| KR | 200458939 Y1 | 3/2012 |
| KR | 102042387 B1 | 11/2019 |
| WO | WO0073662 A1 | 12/2000 |
| WO | WO2011097157 A1 | 8/2011 |
| WO | WO2012140825 A1 | 10/2012 |
| WO | WO2014119175 A1 | 8/2014 |
| WO | WO2017101666 A1 | 6/2017 |
| WO | WO2017118276 A1 | 7/2017 |
| WO | WO2018164145 A1 | 9/2018 |
| WO | WO2019062279 A1 | 4/2019 |

OTHER PUBLICATIONS

Black & Decker, "20V Max* Lithium Sweeper" Instruction Manual, Model No. LSW20, Nov. 2011 (32 pages).
Black & Decker, "36V Lithium Hard Surface Sweeper Vac Instruction Manual," Model No. LSWV36, Jun. 2012 (44 pages).

(56) References Cited

OTHER PUBLICATIONS

Black & Decker, "Cordless Broom Instruction Manual," Catalog Nos. NS118, NS118L, Jun. 2011 (6 pages).
Black & Decker, "Heat Gun Instruction Manual," Catalog No. HG1300, Nov. 2010 (32 pages).
Black & Decker, "Instruction Manual," Catalog No. BV2500, BV9000, May 2004 (4 pages).
Black & Decker, "Straight Tube Blower / Sweeper," Instruction Manual, Catalog No. BL950, Aug. 2003 (3 pages).
Black & Decker, "Sweeper," Instruction Manual, Catalog No. CS100, © 2003 (4 pages).
Charles & Hudson, "Stihl BGA 85 Electric Leaf Blower," <https://www.youtube.com/watch?v=JMK4zdlUbbY> YouTube video publicly available at least as early as Feb. 25, 2012.
DeWalt, "D26950, D26960 Heavy-Duty Heat Gun," Instruction Manual © 2009 (7 pages).
E Magazine, "Blow, Leaves, Blow," Sep./Oct. 2012, p. 36.
Greenworks, "24V Lithium-Ion Cordless Blower 24352," Owner's Manual, Apr. 24, 2014 (18 pages).
Greenworks, "40V Brushless Blower/Vac 24322," Owner's Manual, Jul. 25, 2013 (13 pages).
Greenworks, "40V Lithium-ion Cordless Blower 24212," Owner's Manual, Dec. 24, 2012 (20 pages).
Greenworks, "40V Lithium-Ion Cordless Blower 24252," Owner's Manual, Jan. 15, 2013 (20 pages).
Kobalt Tools, "Kobalt 40-Volt Max* Blower," <https://web.archive.org/web/20150509211919/http://kobalttools.com:80/ . . . > web page publicly available at least as early as May 2015.
Leister, "Hot Air Blower, Hotwind Premium Hotwind System," Brochure, May 2011 (4 pages).
Machine Design, "Leaf Removal is a Breeze," Feb. 24, 2000, pp. 60, 62.
Milwaukee Tool, "M18™ Fuel™ Blower," service parts list bulletin No. 54-05-2705 dated Aug. 2019 (2 pages).
Outdoor Power Equipment, "DR Power introduces lithium-ion battery-powered hand tools," Jul. 2012, p. 60.
Popular Mechanics, "Leaf Mover and Shaker," Oct. 2009, p. 28.
Pro Tool Reviews, "Kobalt 40V Max Lithium-Ion Mower, Blower, and Chainsaw," <https://web.archive.org/web/20140630170346/http://www.protoolreviews.com/tools/outdoor-eq . . . > web page publicly available at least as early as Jun. 2014.
Remington, "18 Volt Cordless Blower RM170B," Operator's Manual, Apr. 2011 (12 pages).
Ryobi, "18 Volt Blower, P2100, P2100A, P2100B," Operator's Manual, Rev. 04, Feb. 25, 2008 (14 pages).
Shop Vac, "Wet/Dry Vacuum," Manual © 2013 (15 pages).
Steinel, "Electronic Heat Guns," <https://web.archive.org/web/20121022121431/http://www.steinel.net/pro . . . > webpage available at least as early as Oct. 2012 (3 pages).
Steinel, "Heat Gun Handbook," © 2007 (28 pages).
Stihl, "Saving Green and Going Green by Choosing Orange," Article dated Feb. 2012 (2 pages).
Stihl, "Stihl BGA 85," Nov. 2010 Manual, © 2011 (30 pages).
Stihl, "Stihl BGA 85," Instruction Manual, © 2011 (56 pages).
Stihl, "Stihl BGA 85," Instruction Manual, © 2013 (60 pages).
Toolmonger, "This Shop-Vac Blows (But in a Good Way)," <https://toolmonger.com/2007/05/10/this-shop-vac-blows-but-in-a-good-way/> Article dated May 10, 2007 (3 pages).
Toro, "Rake and Vac™, Super, and Ultra Blower/Vacuum," Operator's Manual, © 2012 (6 pages).
Troy-Bilt "TB4300 / TB4300B Cordless Blower," Operator's Manual, Mar. 2016 (32 pages).
Worx, "18V Cordless Li-ion Blower/Sweeper, WG540," Manual ©2009 (10 pages).
Worx, "Cordless Li-ion Blower/Sweeper, WG545," Manual ©2015 (28 pages).
International Search Report and Written Opinion for Application No. PCT/US2022/046176 dated Feb. 3, 2023 (10 pages).

\* cited by examiner

FAN FOR HANDHELD BLOWER

RELATED APPLICATIONS

This application is a national phase filing under 35 U.S.C. § 371 of International Application No. PCT/US2022/046176, filed Oct. 10, 2022, which claims the benefit of U.S. Provisional Patent Application No. 63/254,296, filed Oct. 11, 2021, the entire contents of each of which are hereby incorporated by reference.

BACKGROUND

The present disclosure relates to handheld blowers, and more particularly to fans used in handheld blowers.

SUMMARY

In one independent aspect, the disclosure provides a fan including a hub and a plurality of blades extending radially outwardly from the hub and spaced circumferentially about the hub. The plurality of blades includes a reference blade, a first blade, and a second blade. The reference blade is disposed after the first blade in a circumferential direction about the hub. The second blade is disposed after the reference blade in the circumferential direction. The first blade is circumferentially spaced a first distance from the reference blade. The second blade is circumferentially spaced a second distance from the reference blade. The first distance is greater than the second distance.

In another independent aspect, the disclosure provides a fan including a hub having an air guide cone and a blade connection portion, and a plurality of blades extending radially outwardly from the blade connection portion and spaced circumferentially about the hub. The blade connection portion tapers radially inwardly and tangentially meets the air guide cone.

In another independent aspect, the disclosure provides a handheld blower including an air duct extending along an axis, the air duct including an air inlet and an air outlet opposite the air inlet, and a fan disposed in the air duct between the air inlet and the air outlet. The fan rotates about the axis. The fan includes a fan hub extending from an upstream end to a downstream end, the fan hub defining an outer surface with a radius that continuously increases from the upstream end to the downstream end, and a plurality of fan blades extending radially outward from the outer surface between the upstream end and the downstream end. The plurality of fan blades is separated into pairs of blades. The pairs of blades are evenly spaced circumferentially about the fan hub to each other.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
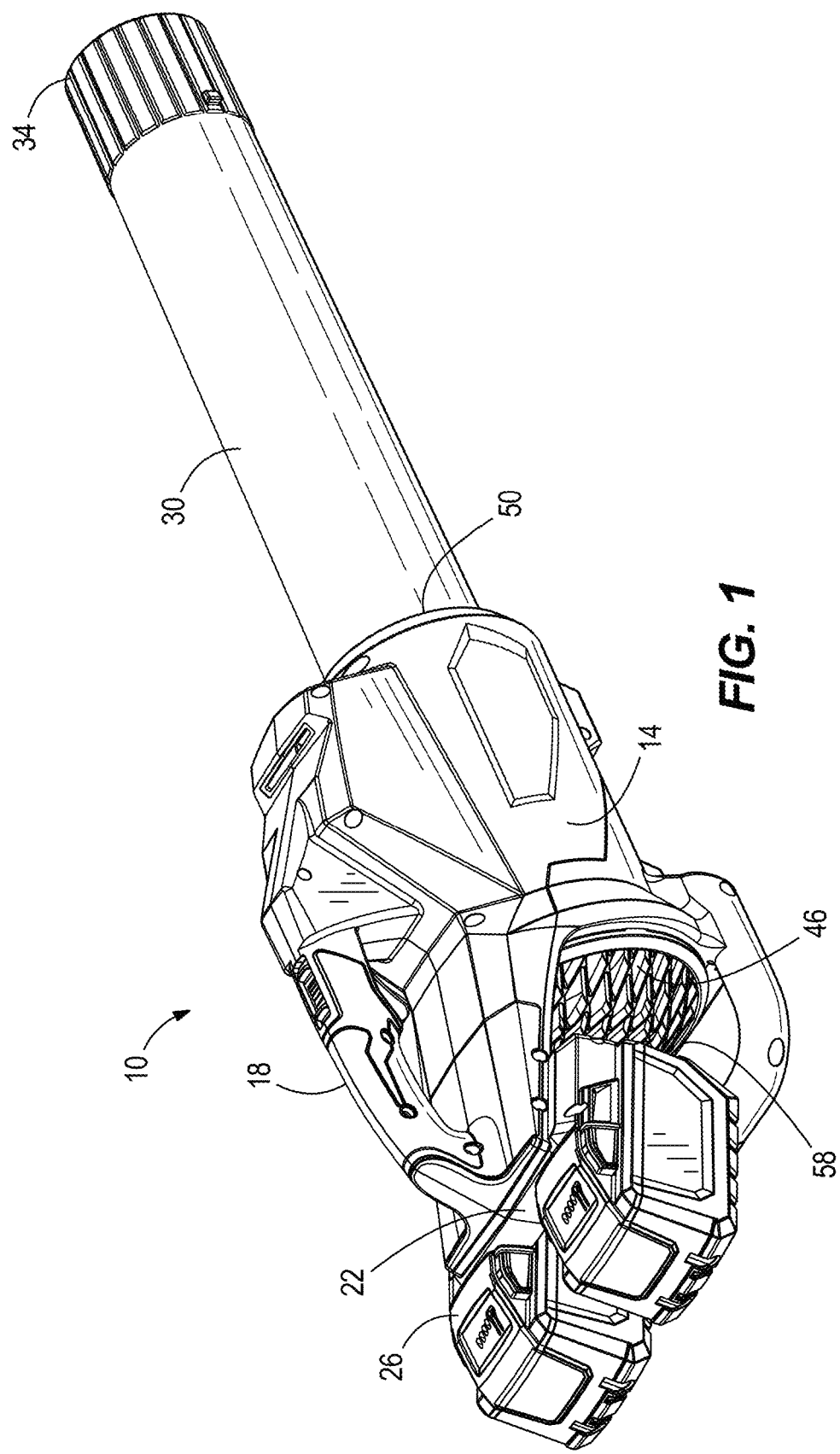
FIG. 1 is a perspective view of a handheld blower, according to embodiments disclosed herein.
Figure 2:
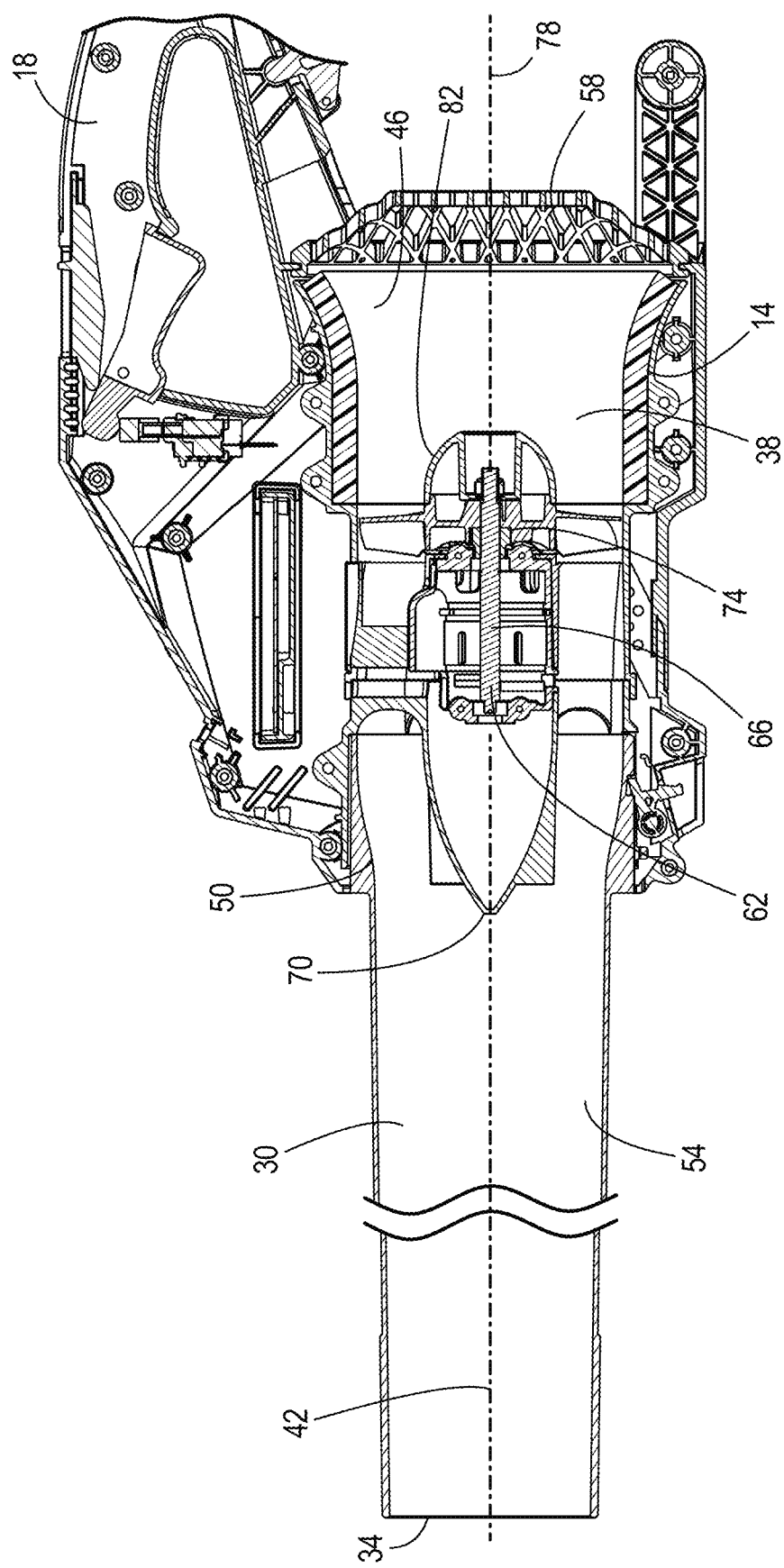
FIG. 2 is a cross-sectional elevation view of a portion of the handheld blower of FIG. 1.

FIGS. 1 and 2 generally illustrate a handheld blower 10 including a housing 14. The housing 14 includes a handle 18 and a battery receiving area 22 for receiving one or more battery packs 26. A blower tube 30 connects to the housing 14 and includes an outlet 34. With reference to FIG. 2, the housing 14 defines an air duct 38 extending along a duct axis 42 between a duct inlet 46 and a duct outlet 50, opposite and downstream of the duct inlet 46. The blower tube 30 is positioned adjacent the duct outlet 50 to create an air flow path 54 extending between the duct inlet 46 and the outlet 34. A grate 58 is positioned adjacent the duct inlet 46. A motor assembly 62 is positioned in the air duct 38 and includes a motor 66 and a fan 74. The motor 66 and the fan 74 are positioned in the air duct 38 for rotation about a rotation axis 78. In the illustrated embodiment, the rotation axis 78 is coaxial with the duct axis 42. In the illustrated embodiment, the motor assembly 62 is assembled such that the fan 74 is upstream from the motor 66. In other embodiments, however, the motor assembly 62 may be assembled in other configurations.

Figure 3:
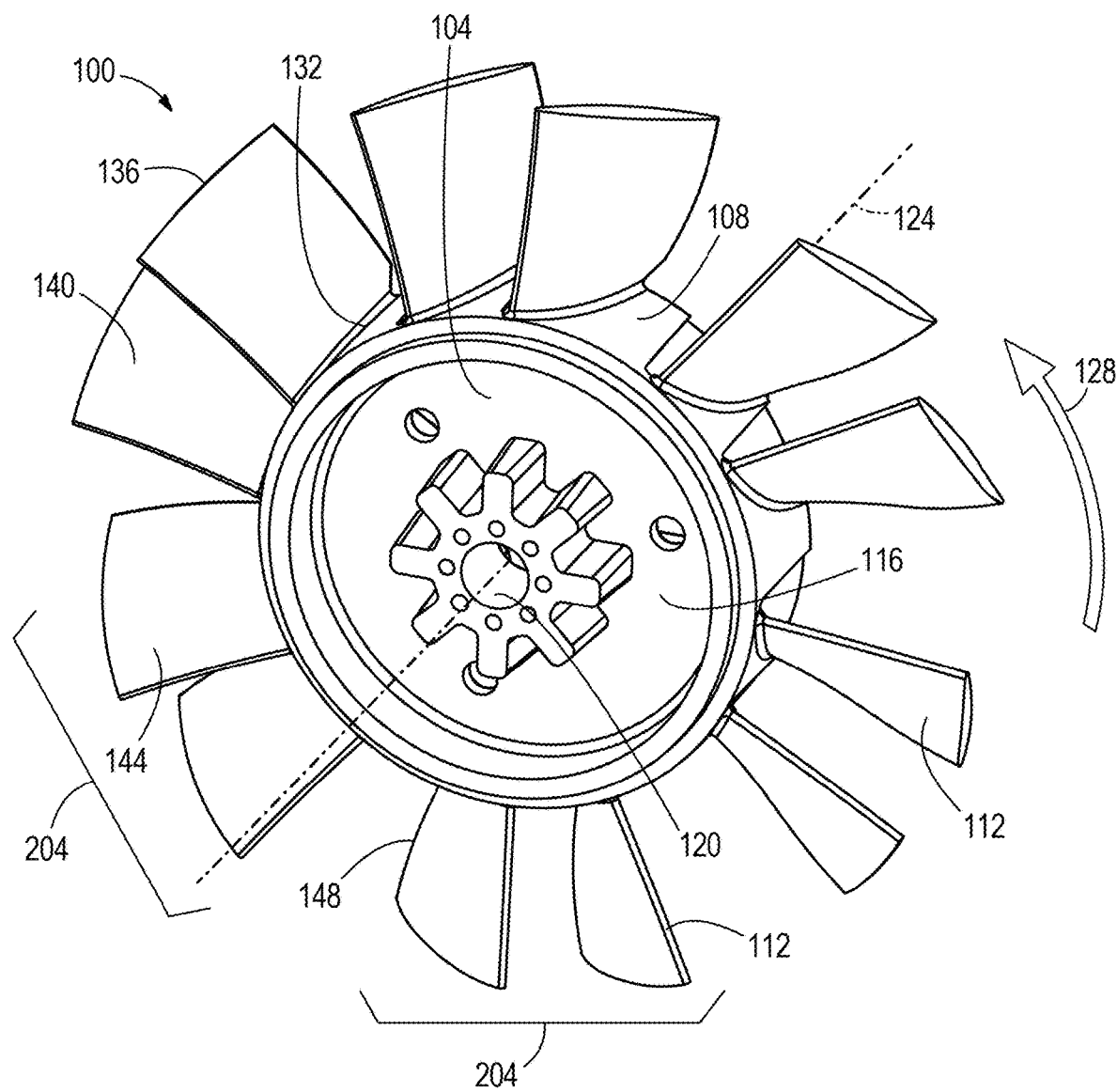
FIG. 3 is a perspective view of a fan, according to embodiments disclosed herein.
Figure 4:
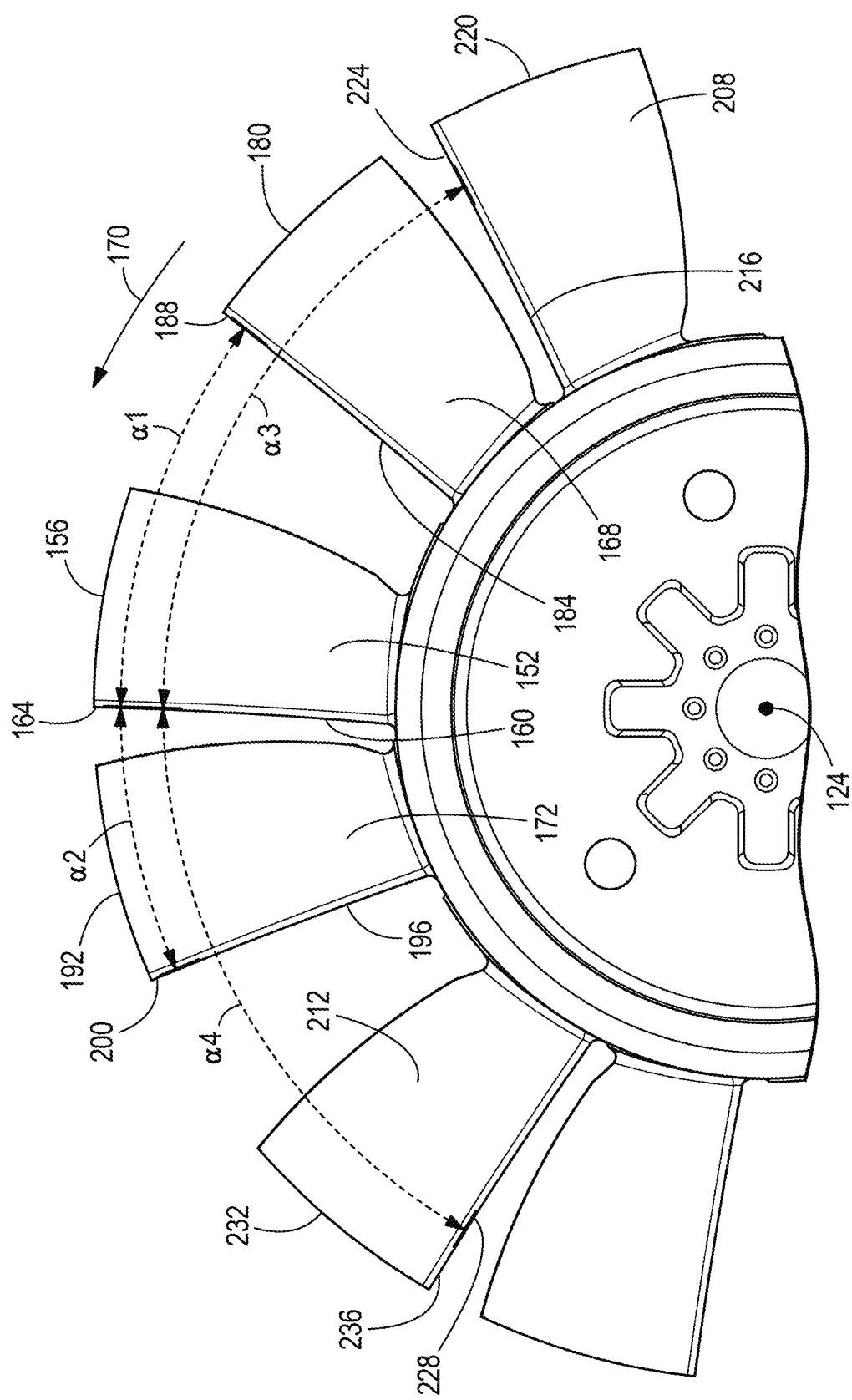
FIG. 4 is a front elevation view of a portion of the fan of FIG. 3.
Figure 5:
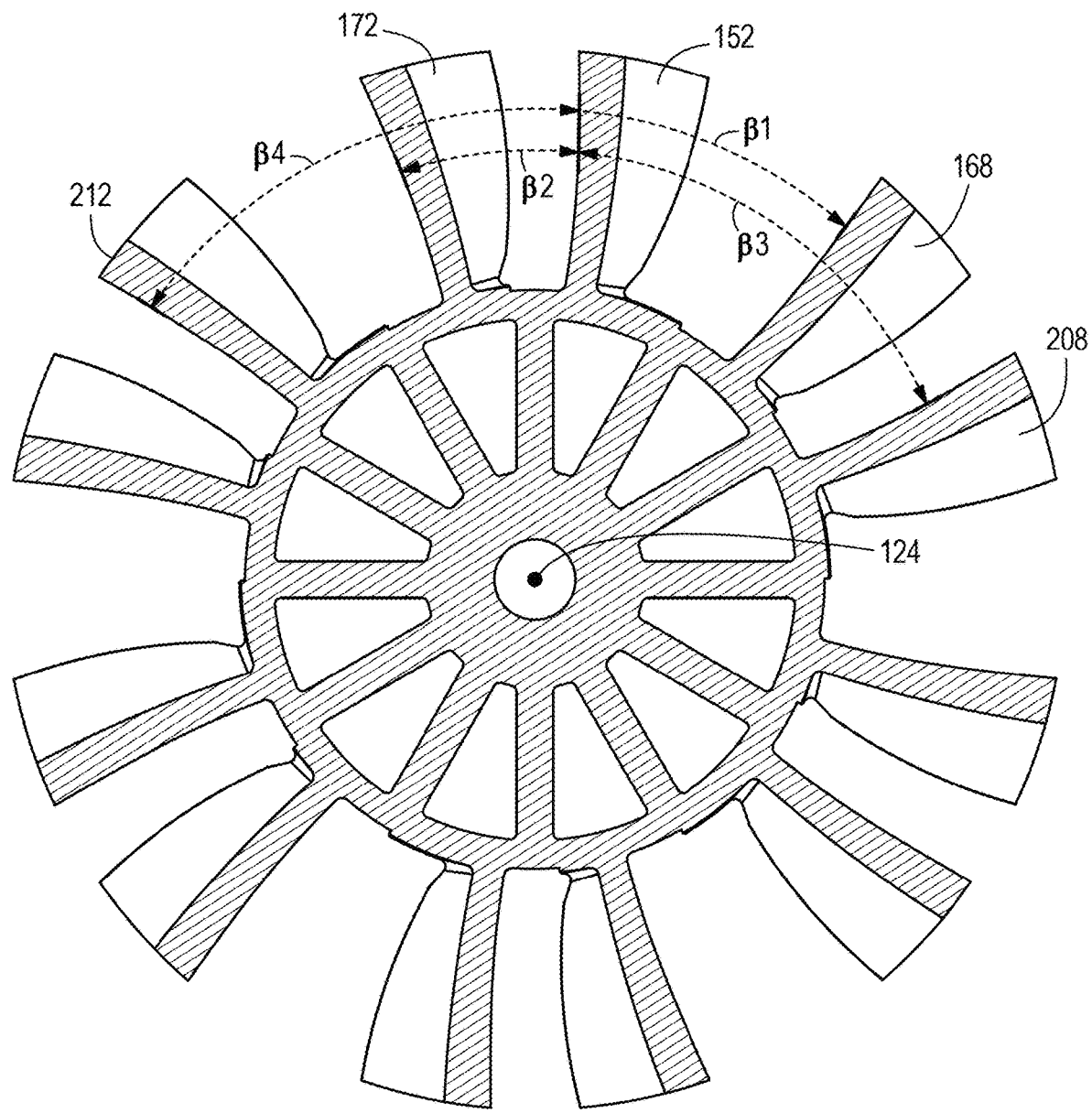
FIG. 5 is a cross-sectional front elevation view of the fan of FIG. 3.

FIGS. 3-5 illustrate a fan 100 for use with, for example, the handheld blower 10 of FIGS. 1-2. The fan 100 includes a fan hub 104 defining an outer surface 108. A plurality of blades 112 extends radially outwardly from the outer surface 108 of the fan hub 104. The fan hub 104 may include a body 116 and a hub cap or air guiding cone (not shown but discussed with regard to other embodiments below). In some embodiments, the hub cap is formed as a separate piece and is removed from the body 116. However, in other embodiments, the hub cap may be formed integrally with the body 116. The fan 100 may include a passage 120 extending through the fan hub 104 that defines a central rotational axis 124 or rotation axis 124 of the fan 100. The fan 100 may be supported in a handheld blower or other air moving machine for rotation about the central rotational axis 124 in a rotation direction 128.

Each blade 112 extends between a blade base 132 and a blade tip 136, with the blade tip 136 located at a cantilevered end 140 of the blade 112. The blade 112 defines a leading edge 144 and a trailing edge 148 extending between the blade base 132 and the blade tip 136. In the illustrated embodiment, the leading edge 144 may be generally straight while the trailing edge 148 may be curved. However, in other embodiments, other shapes of the fan blade may be used. In the illustrated embodiment, each of the plurality of blades 112 is identical to the others such that a pitch, shape, width, and length of the blades are the same.

With specific reference to FIGS. 4 and 5, the plurality of blades 112 may be unevenly spaced about the fan hub 104. For purposes of discussion, one of the plurality of blades 112 has been identified as a reference blade 152. While a specific blade has been identified, and the relationships between the blades are discussed with this respect to the reference blade 152, the relationships apply equally no matter which blade 112 is selected as the reference blade 152, except where otherwise noted.

As shown in FIG. 4, the reference blade 152 has a reference tip 156 and a reference leading edge 160. The reference tip 156 and reference leading edge 160 meet at a reference corner 164. A first neighbor blade 168 (or first blade 168) is located next in order from the reference blade 152 in a direction opposite a circumferential direction 170 (or first direction). In other words, the reference blade 152 is disposed after the first blade 168 in the circumferential direction 170. In the illustrated embodiment, the circumferential direction 170 is the same as the rotation direction 128 of the fan 100, however, in other embodiments, the circumferential direction 170 may be opposite the rotation direction 128. A second neighbor blade 172 (or second blade 172) is located next in order from the reference blade 152 in the circumferential direction 170 (or second direction). The first neighbor blade 168 includes a first tip 180 and a first leading edge 184 which intersect in a first corner 188. The second neighbor blade 172 includes a second tip 192 and a second leading edge 196 which intersect in a second corner 200.

The reference blade 152 is circumferentially spaced a first distance from the first blade 168, and the reference blade 152 is circumferentially spaced a second distance from the second blade 172. Specifically, the first distance may be measured as a first angle $\alpha 1$ measured about the rotation axis 124 between the first corner 188 and the reference corner 164. The second distance may similarly be measured as a second angle $\alpha 2$ measured about the rotation axis 124 between the reference corner 164 and the second corner 200. The first angle $\alpha 1$ and the second angle $\alpha 2$ are different. In the case of the exemplary reference blade 152, the first angle $\alpha 1$ is larger than the second angle $\alpha 2$. This relationship may be inverted if another blade is selected as the reference blade. While the first distance and second distance may be described using angles, it is also possible to use the linear distances or arcuate distances between the blades. The relationships between the spacings would remain the same such that a first length would be larger than a second length.

In the illustrated embodiment, the plurality of blades 112 includes twelve blades 112 separated into pairs of blades 204 evenly spaced around the fan hub 104. Therefore, each blade 112 has a corresponding diametrically opposed blade 112. Additionally, a third neighbor blade 208 (or third blade 208) is located next in order from the first neighbor blade 168 in the first direction. Or in other words, the third blade 208 is positioned before the first blade 168 in the circumferential direction 170. A fourth neighbor blade 212 is located next in order from the second neighbor blade 172 in the second direction. In other words, the fourth blade 212 is positioned after the second blade 172 in the circumferential direction 170. The third neighbor blade 208 includes a third leading edge 216 and a third tip 220 intersecting in a third corner 224, and the fourth neighbor blade 212 includes a fourth leading edge 228 and a fourth tip 232 intersecting in a fourth corner 236. The third blade 208 is circumferentially spaced by a third distance from the reference blade 152. The third distance may be measured as a third angle $\alpha 3$ measured about the rotation axis 124 between the third corner 224 and the reference corner 164. The fourth blade 212 is circumferentially spaced by a fourth distance from the reference blade 152. The fourth distance may be represented as a fourth angle $\alpha 4$ measured about the rotation axis 124 between the fourth corner 236 and the reference corner 164. The third angle $\alpha 3$ is the equal to the fourth angle $\alpha 4$. Again, linear distances may be used instead of angles with the same result, such that a third length would be equal to a fourth length.

The fan 100 is rotationally symmetrical about the rotation axis 124. In other words, the spacing between each of the plurality of blades 112 alternates between the first distance (e.g. the first angle $\alpha 1$) and the second distance (e.g. the second angle $\alpha 2$) in the circumferential direction 170. The rotational symmetry means that the plurality of blades 112 are rotationally balanced about the fan hub 104.

With reference to FIG. 5, while the distances were described as angles measured between respective corners, the relationships between the blades remain the same if like points on each blade are used. For example, FIG. 5 illustrates alternate angles (ß1-ß4) measured between center points on each blade. The first angle ß1 is still different from, and larger than, the second angle ß2. The third angle ß3 is still equal to the fourth angle ß4.

In operation, the uneven spacing allows air to flow through the fan 100 at a high speed while reducing frequencies that are typically perceived by users as being unpleasant compared to fans with evenly spaced blades. For example, embodiments of the fan 100 may primarily generate an output frequency of approximately 1500 Hertz. For comparison, a fan with evenly spaced blades may primarily generate an output frequency of approximately 3200 Hertz.

Figure 6:
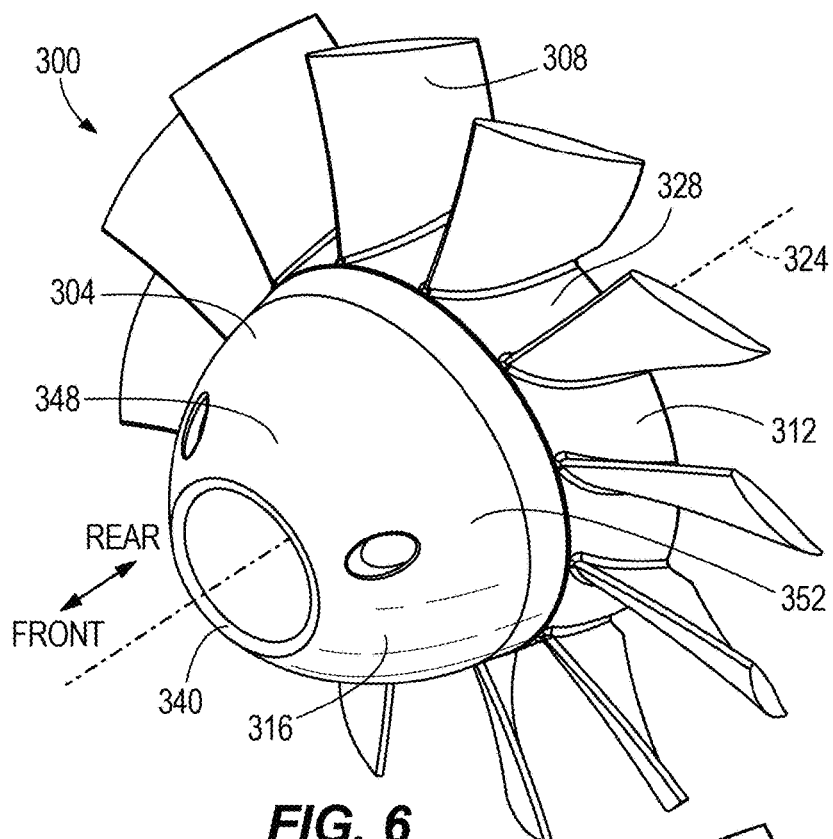
FIG. 6 is a perspective view of a fan, according to embodiments disclosed herein.
Figure 7:
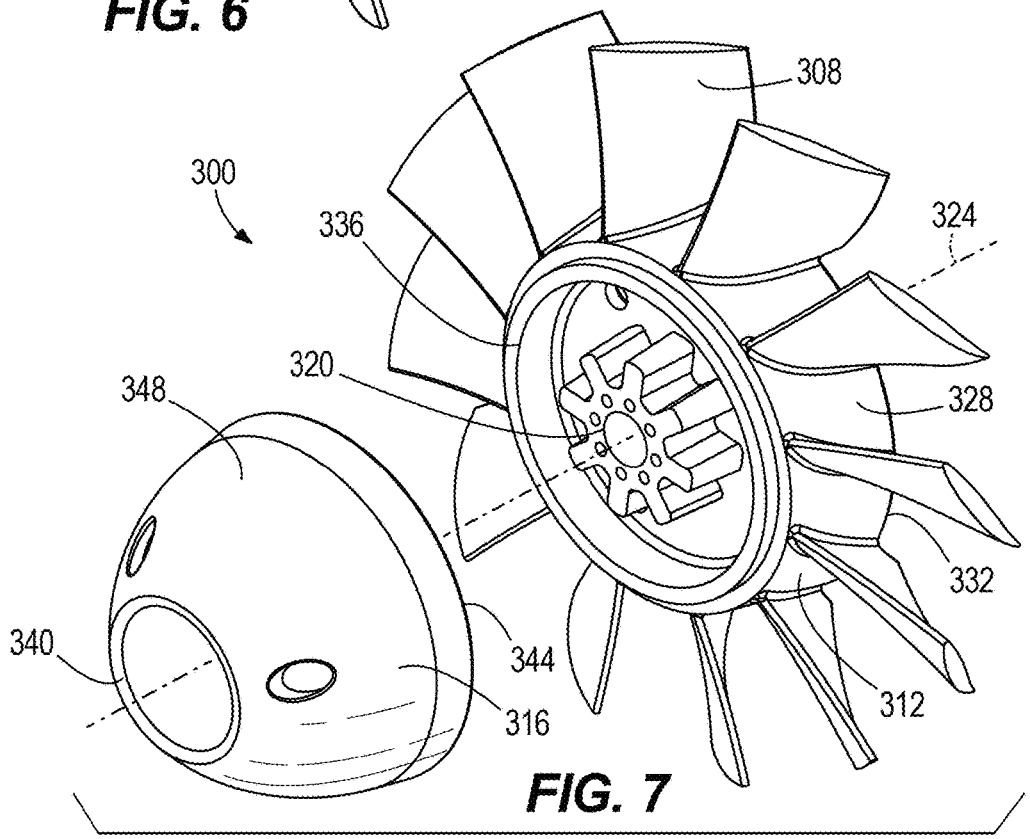
FIG. 7 is a perspective exploded view of the fan of FIG. 6.

FIGS. 6-10 illustrate another embodiment of a fan 300 for use with, for example, the handheld blower 10 of FIGS. 1 and 2. The fan 300 includes a fan hub 304 and a plurality of blades 308 extending radially outwardly from the fan hub 304. The plurality of blades 308 are shown as evenly spaced around the hub 304, however, the plurality of blades 308 may be unevenly spaced as described with respect to FIGS. 3-5 in some embodiments. The fan hub 304 includes a body 312 and an air guiding cone 316. As shown in FIG. 7, the air guiding cone 316 may be removably coupled to the body 312. However, in some embodiments, the air guiding cone 316 may be integrally formed with the body 312. The fan 300 includes a passageway 320 extending through the body 312. The passageway 320 defines a central rotational axis 324 (or rotation axis 324). The passageway 320 may receive a shaft or other support to rotatably support the fan 300 in the handheld blower 10. In the illustrated embodiment of FIG. 6, the forward direction may be generally upstream while a rearward direction may be generally downstream. While the terms forward, front, upstream, rearward, rear, and downstream may be used to describe the fan, these directions do not necessarily correspond to the directions of the motor assembly, the handheld blower, or the environment. The directional language is used for description purposes only and is not meant to limit the embodiment to a certain orientation.

Figure 8:
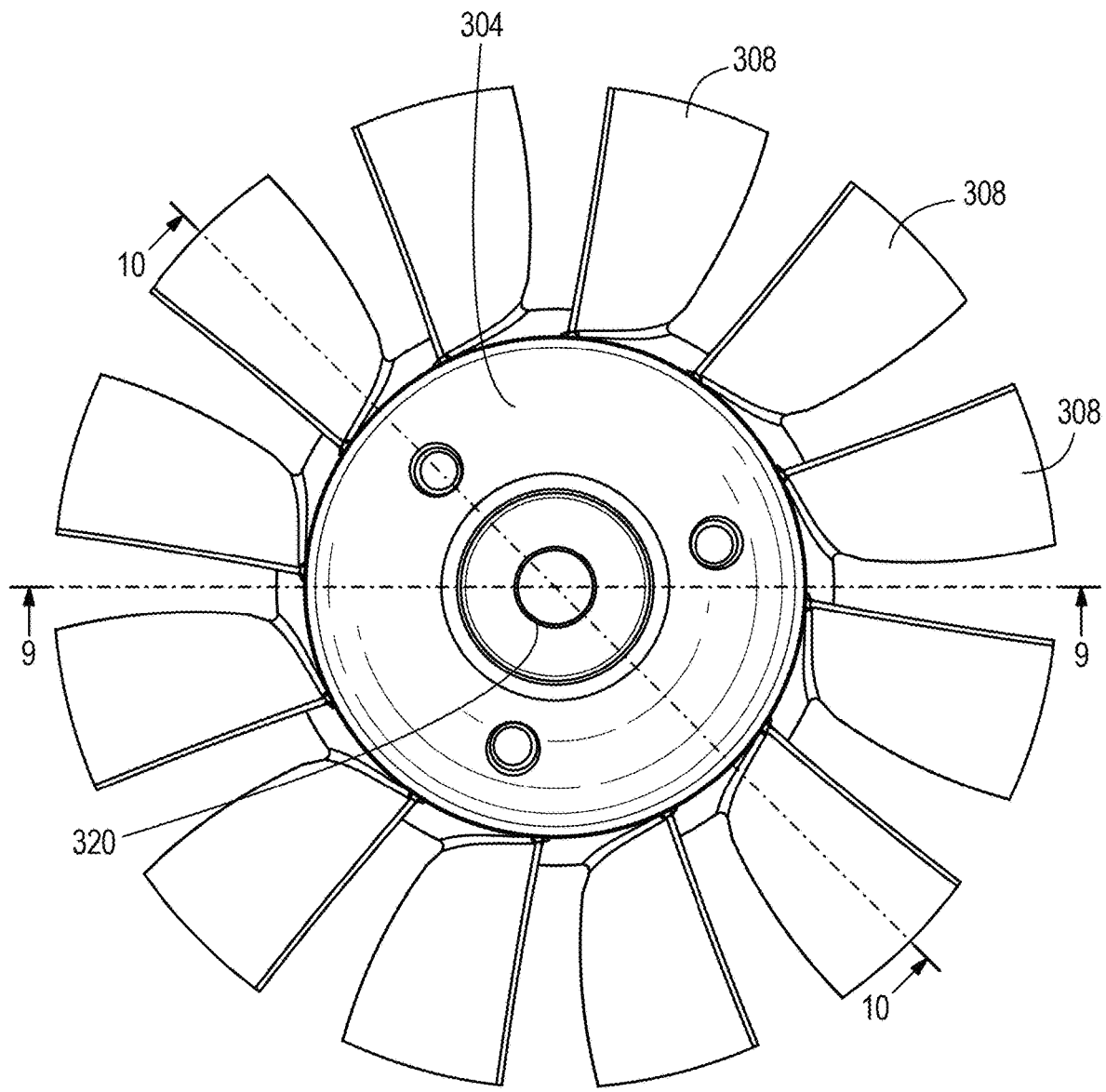
FIG. 8 is a front elevation view of the fan of FIG. 6.

With reference to FIGS. 6-8, as described above, the fan hub 304 includes the body 312 and the air guiding cone 316. The plurality of blades 308 may extend from and be unitarily formed with the body 312. In other embodiments, the plurality of blades 308 may be otherwise secured to the body 312. The body 312 may also be referred to herein as the blade connection portion 312. The body 312 may be tapered radially inward. The body 312 may include a circumferential surface 328. The circumferential surface 328 may be the radial outermost surface of the body 312. The plurality of blades 308 may extend from the circumferential surface 328. The body 312 may extend between a rear end 332 and a body connection end 336 configured to couple to the air guiding cone 316.

The air guiding cone 316 may extend between a truncated tip 340 and a cone connection end 344. The cone connection end 344 may couple to the body connection end 336 of the body 312. The air guiding cone 316 may further include a cone surface 348. The cone surface 348 may be the radially outermost surface of the air guiding cone 316. The cone surface 348 may be curved with respect to the central rotational axis 324.

Figure 9:
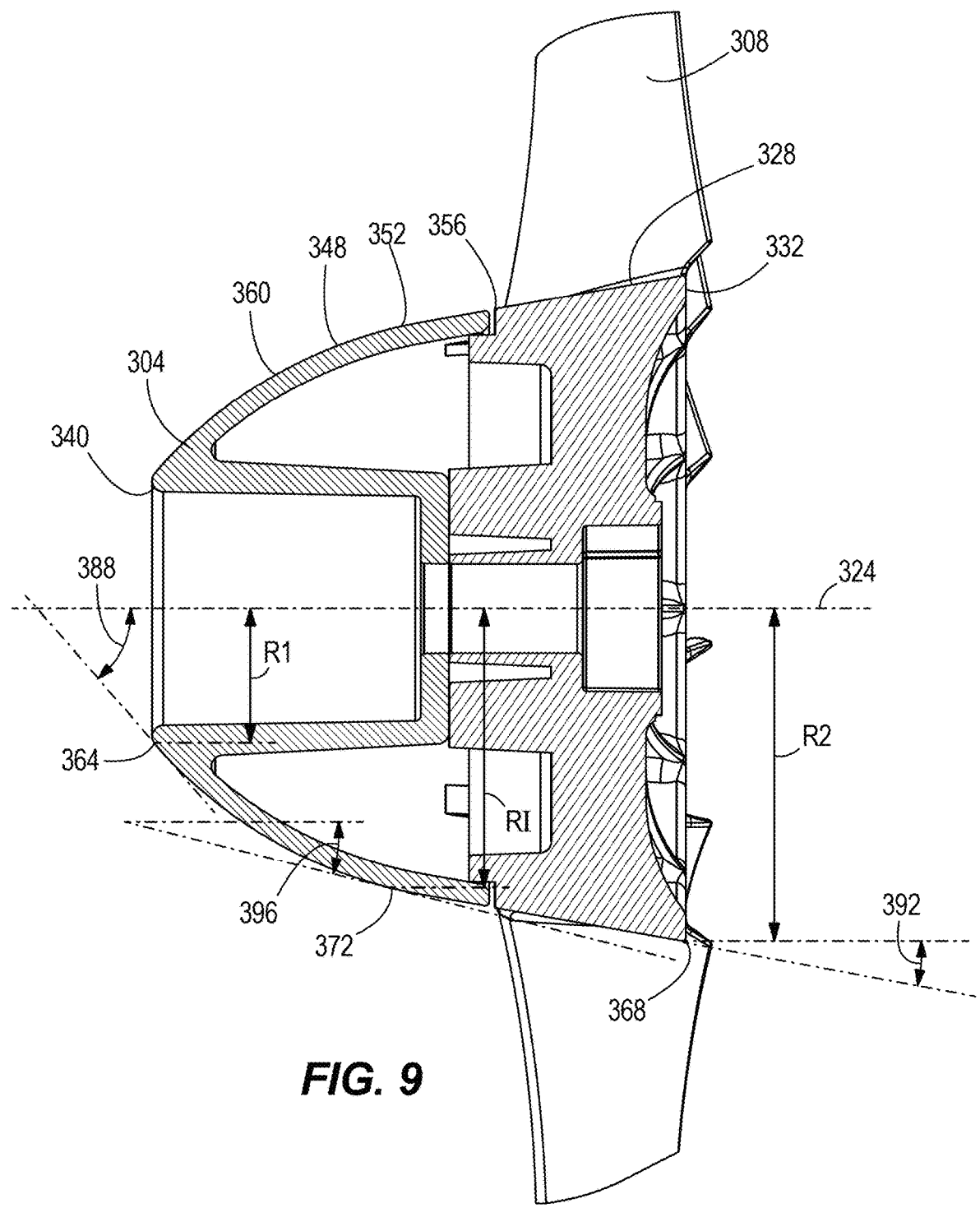
FIG. 9 is a cross-sectional side elevation view of the fan of FIG. 8 taken along line 9-9.
Figure 10:
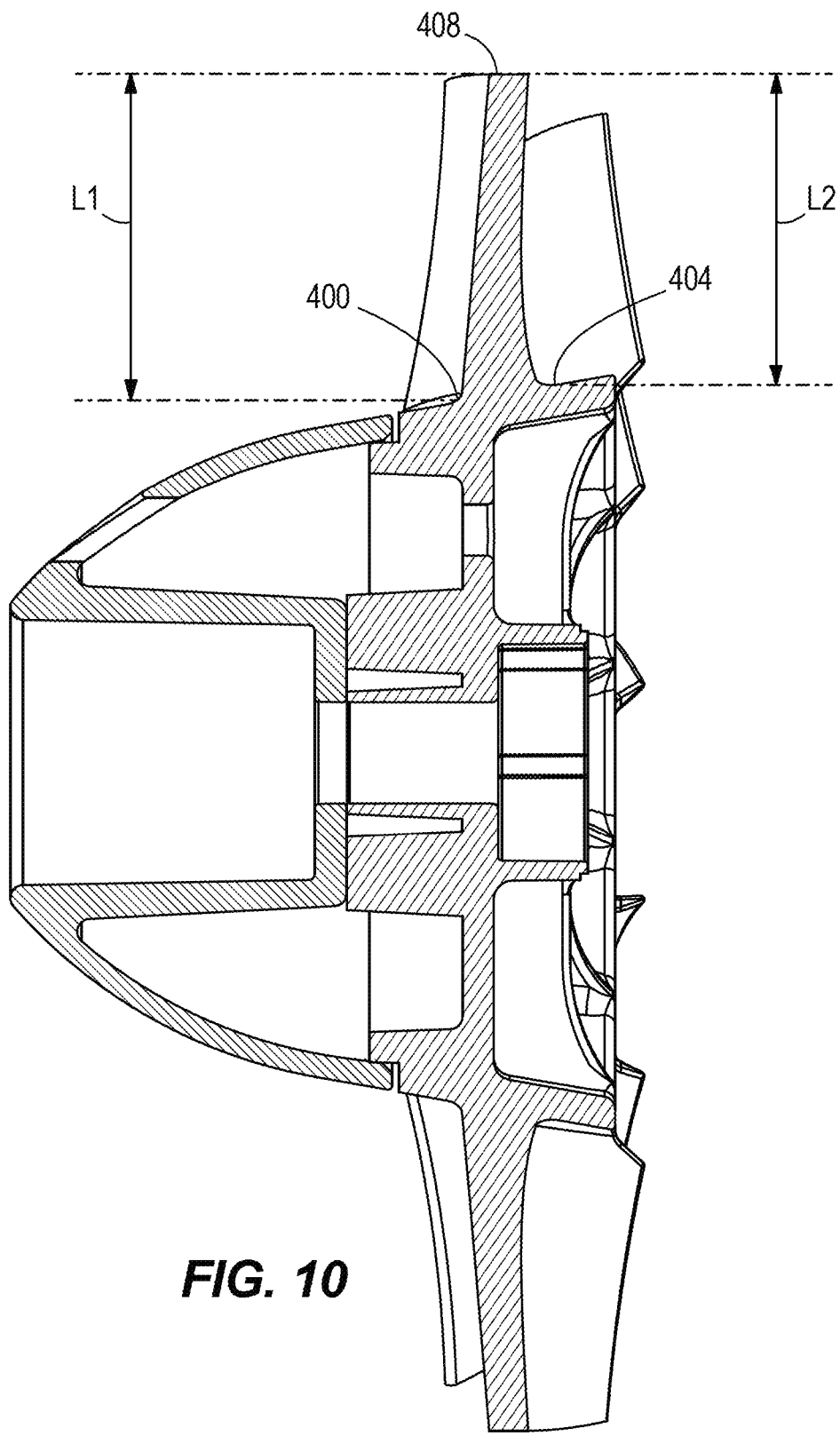
FIG. 10 is a cross-sectional side elevation view of the fan of FIG. 8 taken along line 10-10.

Turning now to FIGS. 9 and 10, the circumferential surface 328 and the cone surface 348 may combine to form an outer hub surface 352. The shape of the air guiding cone 316 and body 312 may be such that the circumferential surface 328 and the cone surface 348 meet tangentially at a connection point 356. The outer hub surface 352 may taper radially inwardly continuously between the rear end 332 and the truncated tip 340.

Specifically, as shown in FIG. 9, in a vertical cross section taken through the fan 300 parallel to the rotation axis 324, the outer hub surface 352 may form a curved profile 360. The curved profile 360 may include a first point 364 located at the truncated tip 340, a second point 368 located at the rear end 332, and an intermediate point 372 located between the first point 364 and second point 368. In some embodiments, the intermediate point 372 is co-located with the connection point 356 between the cone surface 348 and the circumferential surface 328. However, the intermediate point 372 may be any point on the curved profile 360 between the first point 364 and the second point 368. The first point 364 may be radially located at a first distance R1 with respect to the rotation axis 324. The second point 368 may be located at a second distance R2 with respect to the rotation axis 324, and the intermediate point 372 may be radially located at an intermediate distance R1 from the rotation axis 324.

As shown in FIG. 9, a tangent is taken at each of the points 364, 368, 372. A tangent line taken at the first point 364 forms a first angle 388 with respect to the rotation axis 324. A tangent line taken at the second point 368 forms a second angle 392 with respect to the rotation axis 324. Finally, a tangent line taken at the intermediate point 372 forms an intermediate angle 396 with respect to the rotation axis 324. The hub 304 tapers inwardly such that a slope of the outer hub surface 352 is more aggressive at the truncated tip 340 than at the rear end 332. In other words, the first angle 388 is larger than the second angle 392. Additionally, the hub 304 is shaped such that the outer hub surface 352 is never parallel to the rotation axis 324. Finally, the hub 304 is shaped such that the angle of the tangent to the curved profile 360 decreases constantly between the truncated tip 340 and the rear end 332. Thus, the first angle 388 is larger than the intermediate angle 396, which is larger than the second angle 392.

In operation, the shape of the air guiding cone 316 is such that the fan hub 304 has an increased draft angle as compared a standard fan hub. As shown in FIG. 10, each blade 308 is connected to the fan hub 304 at an upstream connection point 400 and a downstream connection point 404. A first length L1 is measured between the upstream connection point 400 and a tip 408 of the blade 308. A second length L2 is measured between the downstream connection point 404 and a tip 408 of the blade 308. Because of the taper of the blade connection portion 312, the first length L1 is larger than the second length L2, meaning that the available blade surface of the plurality of fan blades 308 is maximized, or at least greater than is the case for standard fans, for contacting the operational medium (e.g., air). Thus, the fan 300 has an increased fan efficiency compared to a standard fan.

Although the disclosure has been described in detail with reference to certain preferred embodiments, variations and modifications exist within the scope and spirit of one or more independent aspects of the disclosure as described.

What is claimed is:

1. A fan comprising:
a hub;
a plurality of blades, each blade of the plurality of blades including a blade base coupled to the hub, each blade extending radially outwardly from the hub to a cantilevered end, the plurality of blades spaced circumferentially about the hub at a common axial location of the hub, the plurality of blades including a reference blade, a first blade, and a second blade; and
wherein
the reference blade is disposed after the first blade in a circumferential direction about the hub and the second blade is disposed after the reference blade in the circumferential direction,
the first blade is circumferentially spaced a first distance from the reference blade,
the second blade is circumferentially spaced a second distance from the reference blade, and
the first distance is greater than the second distance; and
wherein the fan is rotationally symmetrical.

2. The fan of claim 1, wherein the plurality of blades includes twelve blades.

3. The fan of claim 1, wherein
the hub includes an outer surface, and
the plurality of blades extends from the outer surface.

4. The fan of claim 1, wherein the blades are grouped in pairs circumferentially about the hub.

5. The fan of claim 1, wherein the blades are identical.

6. The fan of claim 1, wherein the hub includes a passage for receiving a shaft, the passage defining a central rotational axis of the fan.

7. The fan of claim 1, wherein each blade of the plurality of blades has a corresponding diametrically opposed blade.

8. The fan of claim 1, wherein any blade of the plurality of blades can be the reference blade.

9. The fan of claim 8, wherein the circumferential spacing between respective blades alternates between the first distance and the second distance in the circumferential direction.

10. A fan comprising:
a hub including an air guide cone and a blade connection portion, the blade connection portion tapering radially inwardly and tangentially meeting the air guide cone; and
a plurality of blades, each blade of the plurality of blades including a blade base coupled to the hub at a common axial location of the hub, each blade extending radially outwardly from the blade connection portion to a cantilevered end,
wherein at least a portion of the plurality of blades are unevenly spaced about the hub, wherein the plurality of fan blades separated into pairs of blades, the pairs of blades evenly spaced circumferentially about the hub with each other, wherein the fan is rotationally symmetrical.

11. The fan of claim 10, wherein the blade connection portion tapers radially inwardly along an entire axial length of the blade connection portion.

12. The fan of claim 10, wherein the air guide cone is removably coupled to the blade connection portion.

13. The fan of claim 10, wherein each blade is formed as a single unitary part with the blade connection portion.

14. The fan of claim 10, wherein
the air guide cone and the blade connection portion form an outer surface of the hub, and
the outer surface of the hub tapers inwardly along an entire axial length of the hub.

15. The fan of claim 10, wherein each blade of the plurality of blades is longer radially through an upstream connection point than through a downstream connection point.

16. The fan of claim 10, wherein the air guide cone has a truncated tip.

17. The fan of claim 10, wherein the blade connection portion includes a passage defined therein for receiving a shaft, the passage defining a central rotational axis of the fan.

18. The fan of claim 17, wherein the blade connection portion tapers radially inwardly along the central rotational axis in an upstream direction.

19. A handheld blower comprising:

an air duct extending along an axis, the air duct including an air inlet and an air outlet opposite the air inlet; and a fan disposed in the air duct between the air inlet and the air outlet, the fan configured to rotate about the axis, the fan including a fan hub extending from an upstream end to a downstream end, the fan hub defining an outer surface with a radius that continuously increases from the upstream end to the downstream end, the fan hub including an air guide cone and a blade connection portion, and a plurality of fan blades extending radially outwardly from the outer surface of the blade connection portion between the upstream end and the downstream end, each blade of the plurality of blades including a blade base coupled to the blade connection portion of the hub, each blade of the plurality of blades extending to a cantilevered end, the plurality of fan blades separated into pairs of blades, the pairs of blades evenly spaced circumferentially about the fan hub with each other, wherein at least a portion of the plurality of blades are unevenly spaced about the hub, further wherein the fan is rotationally symmetrical.

* * * * *